United States Patent [19]
Chen et al.

[11] Patent Number: 5,157,834
[45] Date of Patent: Oct. 27, 1992

[54] RAZOR MECHANISM WITH SLIDABLE CARTRIDGE SUPPORT

[75] Inventors: Evan N. Chen, Fairfield; Frank A. Ferraro, Trumbull, both of Conn.

[73] Assignee: Warner-Lambert Company, Morris Plains, N.J.

[21] Appl. No.: 507,425

[22] Filed: Apr. 10, 1990

[51] Int. Cl.⁵ ............... B26B 21/14; B26B 21/00; B26B 21/06; B26B 21/08
[52] U.S. Cl. .................... 30/85; 30/50; 30/49; 30/47
[58] Field of Search ............ 30/32, 47, 49, 50, 85, 30/87, 89, 66, 75, 330

[56] References Cited

U.S. PATENT DOCUMENTS

| | | | |
|---|---|---|---|
| Re. 30,913 | 4/1982 | Cartwright et al. | |
| 3,938,247 | 2/1976 | Carbonell | 30/50 |
| 3,964,159 | 6/1976 | Ferraro | 30/50 |
| 4,069,580 | 1/1978 | Cartwright et al. | |
| 4,253,236 | 3/1981 | Jacobson | 30/47 |
| 4,266,340 | 5/1981 | Bowman | 30/47 |
| 4,428,116 | 1/1984 | Chen et al. | 30/47 |
| 4,443,939 | 4/1984 | Motta et al. | |
| 4,459,744 | 7/1984 | Esnard | 30/49 |
| 4,516,320 | 5/1985 | Peleckis | |
| 4,739,553 | 4/1988 | Lazarchik | 30/47 |
| 4,797,998 | 1/1989 | Motta | |
| 4,854,043 | 8/1989 | Chen | |
| 5,031,316 | 7/1991 | Oldroyd | 30/49 |

FOREIGN PATENT DOCUMENTS

| | | |
|---|---|---|
| 1262623 | 11/1989 | Canada. |
| 300478 | 1/1989 | European Pat. Off. |
| 2198382 | 6/1988 | United Kingdom. |

Primary Examiner—Douglas D. Watts
Assistant Examiner—Paul M. Heyrana, Sr.
Attorney, Agent, or Firm—Richard S. Bullitt

[57] ABSTRACT

A razor mechanism particularly suited for use with a flexible cartridge having at least one attachment member moveable in a direction toward the longitudinal axis of the razor mechanism in response to the flexing of the razor cartridge during shaving and a cartridge support disposed in contact with the cartridge for assisting the cartridge in returning to a substantially linear configuration.

33 Claims, 15 Drawing Sheets

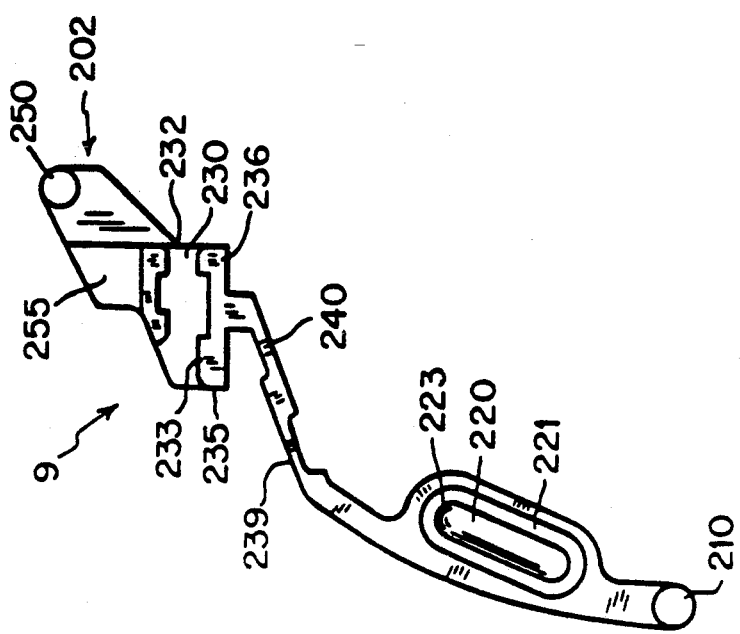
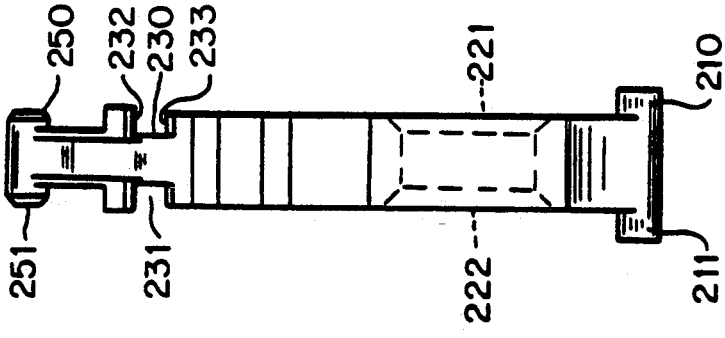

RAZOR MECHANISM WITH SLIDABLE CARTRIDGE SUPPORT

BACKGROUND OF THE INVENTION

The present invention is directed to a razor mechanism and, more particularly, to a razor mechanism with a slidable cartridge support adapted to support a flexible razor cartridge.

Many types of razor mechanisms are known in the art. Razor mechanisms are typically designed to securably support a cartridge containing at least one razor blade at the ends and at least one midpoint of the cartridge.

Among the various types of razor mechanisms known in the art are the channel-type razors which typically have two fixed opposing bars adapted to slidably receive a cartridge having a corresponding fixed track. Such channel-type razors provide support to a cartridge along the entire longitudinal length of the cartridge. An example of a "dynamic" cartridge, i.e. a cartridge having a changeable blade geometry having a track for such support is shown in U.S. Pat. No. 4,516,320 to Peleckis.

Another type of razor known in the art includes spring actuated engaging members which, upon the application of force to an actuator button, move inwardly or outwardly. After the cartridge has been properly positioned on the razor handle, the actuator button is released allowing the engaging members to return to their non-biased position and thereby engage the razor cartridge. Such razors have been designed to either maintain the razor cartridge fixed with respect to the razor handle or, are of the "pivoting" type, which allow the cartridge to pivot on the razor during shaving. An improved razor which allows the cartridge to pivot or to be locked in a non-pivoting manner is disclosed in U.S. Pat. No. 4,797,998 which issued to Motta on Jan. 17, 1989 entitled Lockable Pivotable Razor. The pivoting cartridge engaging arms disclosed in this Motta patent are releasably locked to provide pivoting support for a cartridge.

The attaching mechanisms of the razors known in the prior art have generally been designed to remain in fixed lateral positions while the razor is in use. For example, U.S. Pat. No. 4,069,580 to Cartwright et al., which reissued as U.S. Pat. No. Re. 30,913, discloses a flexible blade cartridge wherein the cartridge is supported on fixed pins of the shaving handle head. Another support for a flexible blade cartridge is disclosed in U.S. Pat. No. 4,443,939 to Motta et al.

In order to provide a closer shave, a new type of flexible razor cartridge has recently been developed. This new flexible razor head, disclosed in U.S. Pat. No. 4,854,043 issued on Aug. 8, 1989 which is hereby incorporated by reference, comprises a flexible cartridge which is designed to flex along its longitudinal axis during shaving. It will be appreciated by those skilled in the art that when a flexible cartridge flexes along its longitudinal axis, the linear distance between the ends of the cartridge decreases. Since the attachment mechanisms of razors known in the art have been conventionally designed to remain in fixed positions except when the cartridge is being attached or detached from the razor, such conventional handles would either not permit the desired flexing of the flexible-type cartridges or, if such flexing was permitted, would create the risk that the cartridge becomes dislodged from the razor mechanism. Pending U.S. patent application Ser. No. 07/361,454 filed on Jun. 5, 1989 entitled "Razor Mechanism", which is hereby incorporated by reference, discloses alternatives to conventional designs. The alternatives have attachment members which provide moving support to a flexible cartridge which flexes during shaving.

Additionally, some razor mechanisms known in the art for flexible cartridges require the flexing of the razor cartridges when the cartridge is being attached to the razor mechanism. It would be very desirable to eliminate the danger inherent in the manual flexing of a flexible cartridge which could slip and injure the user.

In light of the relatively new flexible-type cartridge design, it is also desirable to provide a razor mechanism wherein the attaching mechanism will securably connect a flexible cartridge to the razor handle while permitting the cartridge to flex during shaving. Since the natural memory of the materials used in forming the flexible cartridge may not be sufficient to return the flexible cartridge to a straight configuration, a preferred razor mechanism would provide a straightening effect. Additionally, it would be especially advantageous to provide a razor mechanism which gives additional support to a flexible cartridge when the cartridge is engaged.

BRIEF DESCRIPTION OF THE INVENTION

The present invention comprises a razor mechanism having attachment members and a cartridge support which are movable in response to the flexing of a flexible cartridge during shaving. The razor mechanism preferably comprises a housing, an actuator, at least one attachment member, and a cartridge support. The actuator is slidably connected to the housing and has at least one prong member which engages the attachment member. The attachment member is partially disposed within the housing and has an attachment end for engagement with a flexible cartridge in a manner which provides moveable support to the cartridge when the cartridge is flexed during shaving. The cartridge support is slidably disposed within the housing and movably engages a center region of the cartridge. The cartridge support is advantageously biased in the distal direction to assist the attachment members in returning a deflected razor cartridge to a substantially straight configuration.

BRIEF DESCRIPTION OF THE DRAWINGS

FIG. 8 is a top-view of an attachment member of one embodiment of the present invention.

FIG. 9 is a side-view of the attachment member illustrated in FIG. 8.

FIG. 10 is a top-view of the distal end of the attachment member illustrated in FIG. 8 taken from the direction of Arrow 9.

DETAILED DESCRIPTION

One embodiment of the present invention is a razor mechanism particularly adapted for supporting flexible cartridges and generally comprises a housing, an actuator, at least one attachment member, and a cartridge support wherein the attachment member and cartridge support are movable in response to the flexing of a flexible cartridge during shaving. The cartridge support is preferably slidably disposed along the central axis of the razor mechanism. At least a portion of the cartridge support extends outside of the housing for movable engagement with a flexible cartridge. In accordance with the various embodiments described in further detail below, the cartridge support is continuously biased outwardly such that the distal end of the cartridge support abuts the bottom of a flexible cartridge, i.e. the side opposite the cap, to assist the flexible cartridge in returning to a substantially linear configuration after flexing. The distal movement of the cartridge support is advantageously limited such that the cartridge support does not cause the flexible cartridge to bow outwardly.

The razor mechanism of the present invention also comprises at least one attachment member for movably supporting a flexible cartridge during shaving. The attachment end of the attachment member may move linearly or in an arcuate fashion to provide movable support to the flexible cartridge. The attachment member is in sliding communication with a spring-biased actuator which normally urges the attachment end of the attachment member outwardly. Thus, it will be appreciated by those skilled in the art that the attachment member and cartridge support cooperate in returning the flexible cartridge to its substantially linear configuration.

Figure 1:
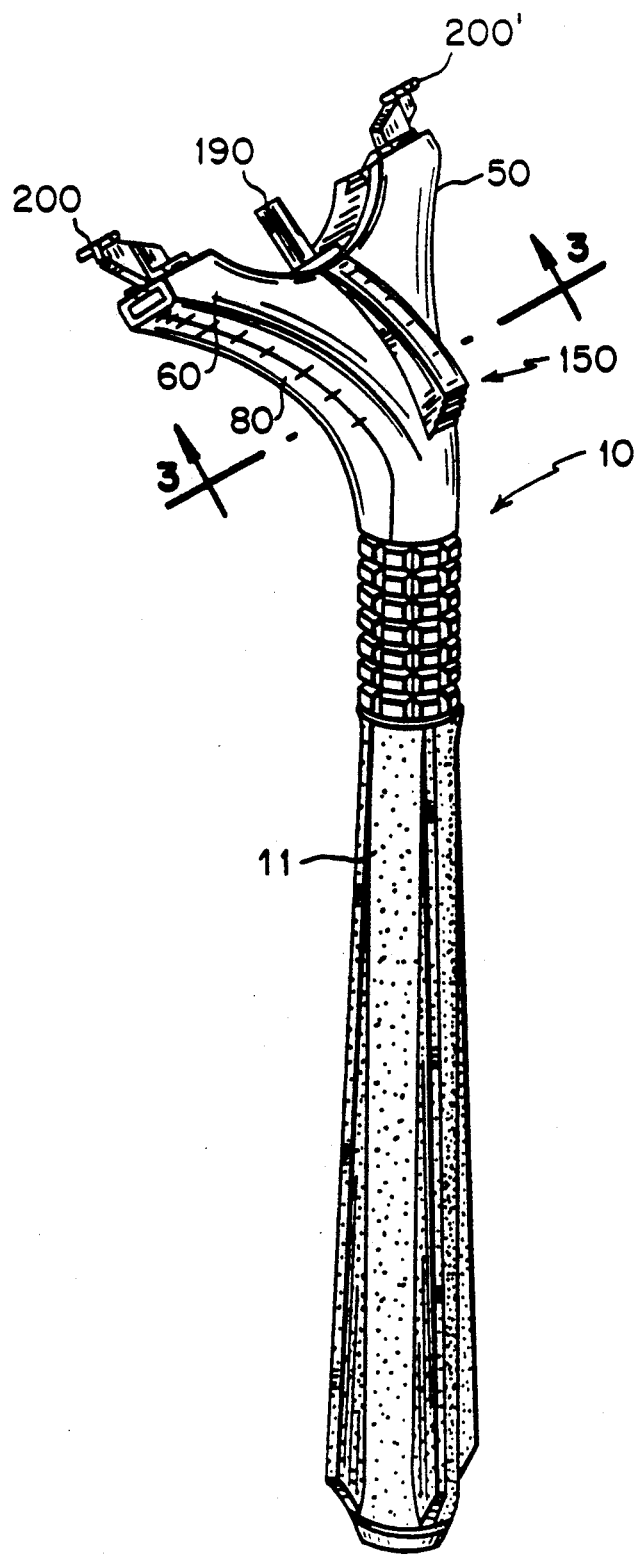
FIG. 1 is a perspective view of the razor mechanism of one embodiment of the present invention.
Figure 2:
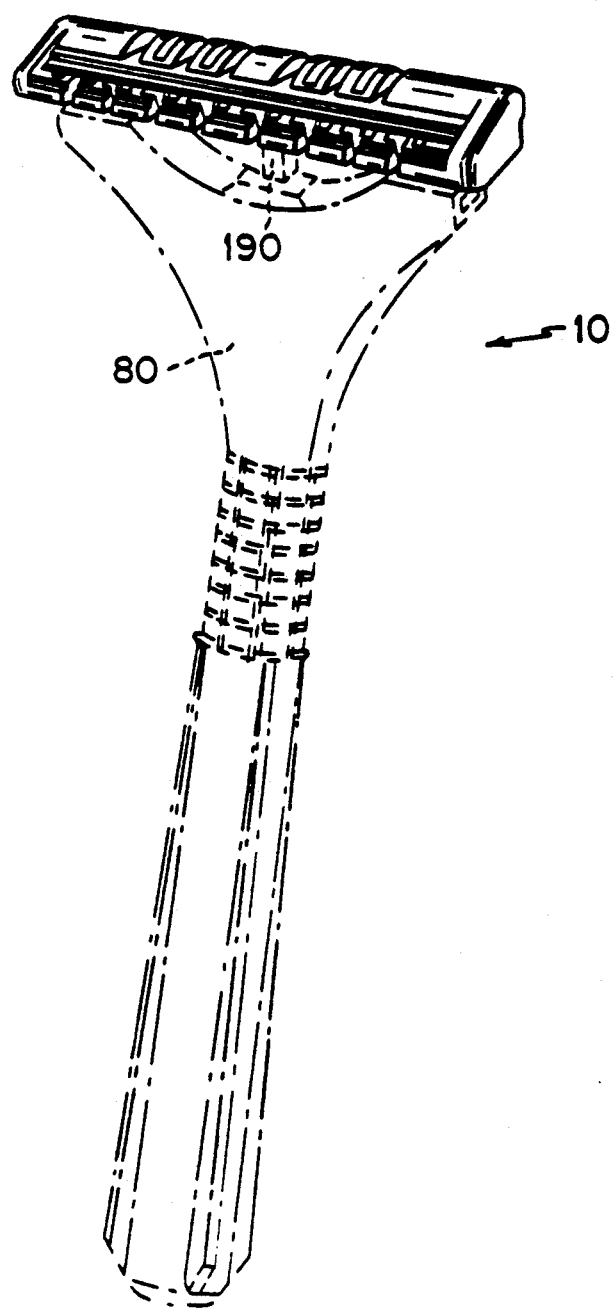
FIG. 2 is a perspective view of one embodiment of the present invention illustrating the placement of a flexible cartridge thereon.

As shown in FIGS. 1-11, razor mechanism 10 of one embodiment of the present invention comprises a housing 50, two attachment members 200, 200', an actuator 150 and a cartridge support 190. The razor mechanism 10 is adapted to be attached to a handle extension 11. FIG. 2 illustrates the positioning of a cartridge on razor mechanism 10.

Figure 3:
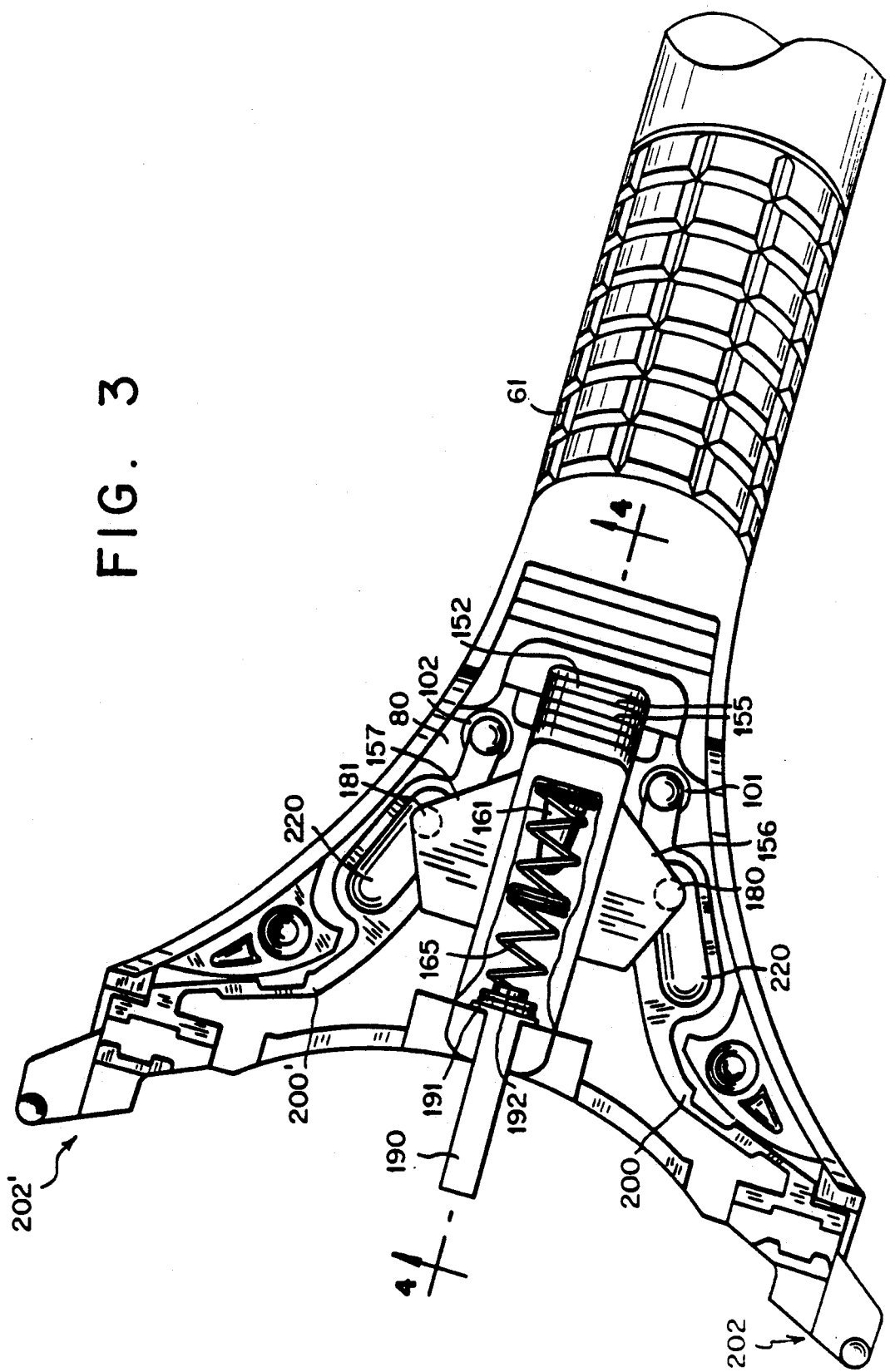
FIG. 3 is a cross-sectional view of the razor mechanism of FIG. 1 taken along lines 3—3.

With particular reference to FIGS. 3-7, in one embodiment of the present invention, housing 50 comprises a top cover 60 and a bottom frame 80. FIG. 3 has sections removed to illustrate the cooperative arrangement of the attachment members 200, 200' with the actuator 150 and the positioning of the actuator/support spring 165 and cartridge support 190.

Figure 5:
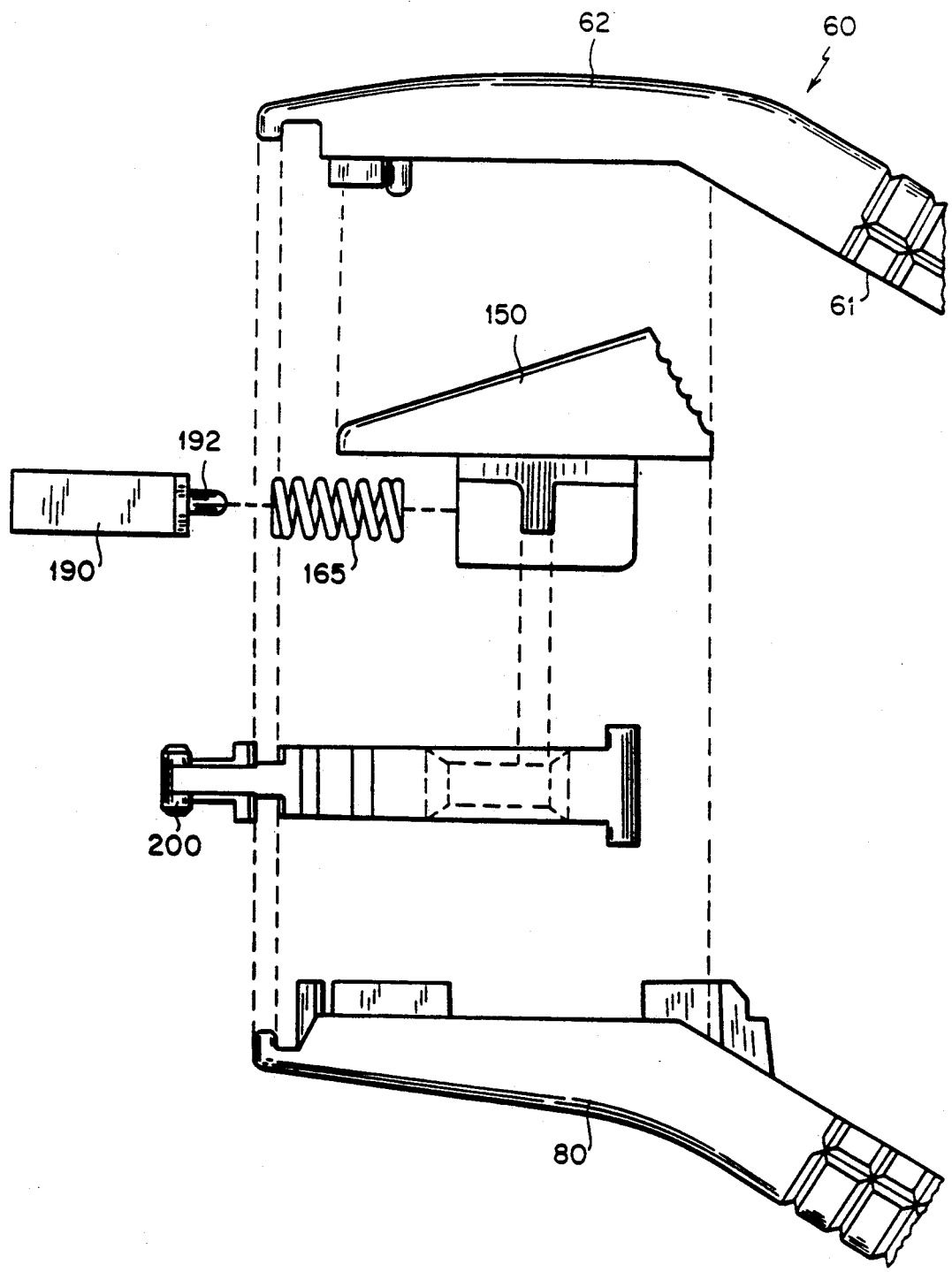
FIG. 5 is an exploded side-view of the embodiment of the present invention illustrated in FIGS. 3 and 4.

With reference to FIG. 5, top cover 60 comprises a gripping portion 61 and a control portion 62. Control portion 62 has a central longitudinal axis L best shown in FIG. 7. Gripping portion 61 may be designed to have any desirable cross section, for example cylindrical, and is preferably knurled to facilitate gripping by the person shaving. FIG. 5 which is an exploded view of this embodiment generally illustrates the relationship between top cover 60, bottom frame 80, center cartridge support 190 and attachment member 200 which are described in further detail below.

Figure 6:
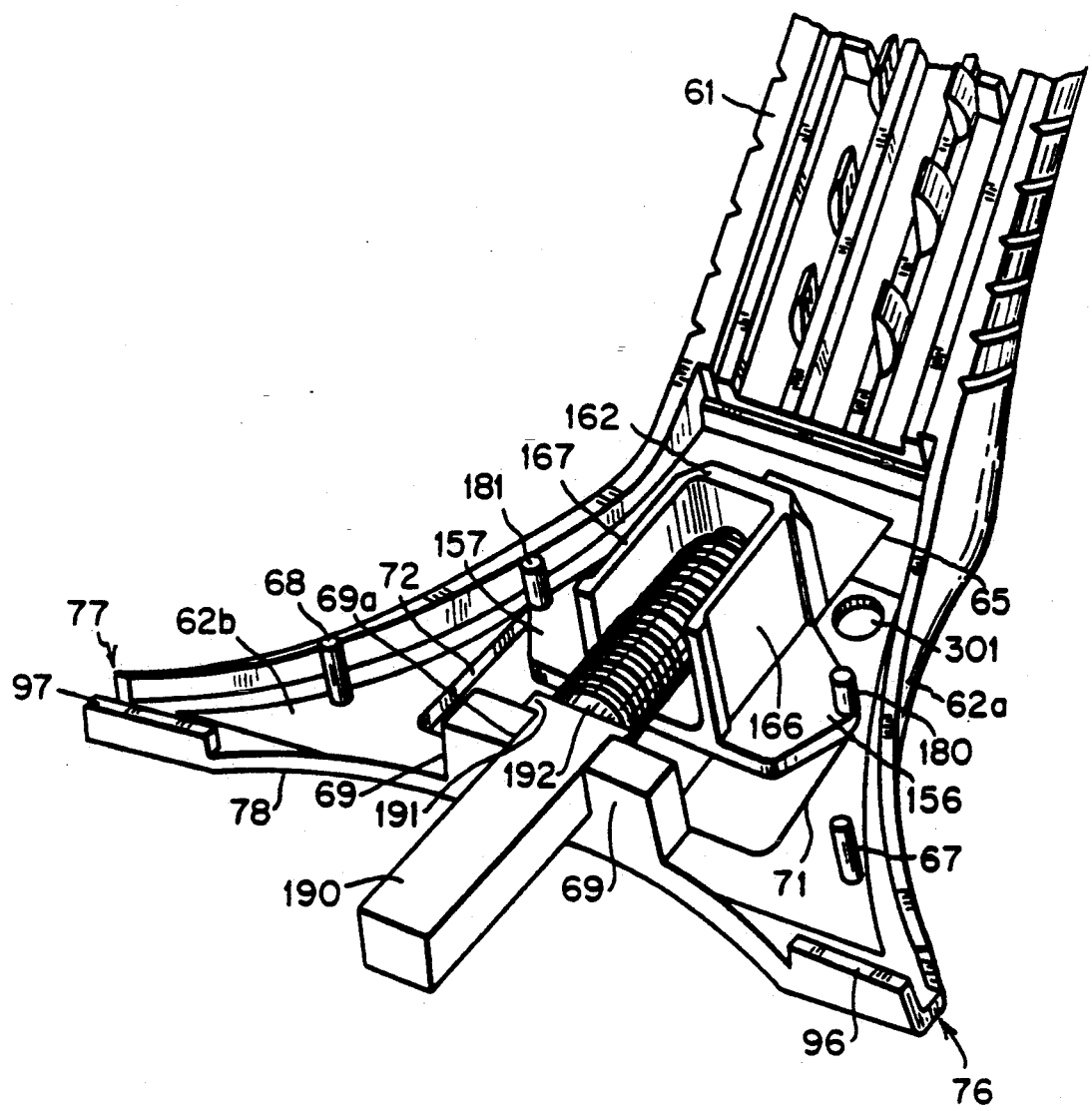
FIG. 6 is a perspective bottom-view of the top cover assembly of the razor mechanism illustrated in FIGS. 3 and 4.

FIG. 6 is a bottom view of the top cover 60 with actuator 150, cartridge support 190 and actuator/support spring 165 assembled thereon. As illustrated, control portion 62 of top cover 60 has an exterior side 62a and an interior side 62b. Control portion 62 also comprises a window 65 passing through control portion 62 from exterior side 62a to interior side 62b. The longitudinal edges of window 65 are substantially parallel to longitudinal axis L. Window 65 is adapted to slidably receive actuator 150 and is preferably located in the central region of control portion 62.

The interior side 62b of control portion 62 comprises an abutment member 69 which extends downwardly from interior side 62b as shown in FIG. 6 and is preferably disposed adjacent the distal end of window 65. As used herein, the term "distal" refers to the end of an element closest to the end of the razor mechanism which receives the cartridge and the term "proximal" refers to the opposite end, i.e. closest to the handle. According to this embodiment of the present invention, cartridge support 190 is essentially oblong with a shoulder member 191 and a support pin 192 disposed at the proximal end thereof. The shoulder member 191 abuts the proximal side of a central recess 69a of abutment member 69 to limit the movement of the cartridge support 190 in the distal direction. While the illustrated cartridge support 190 has a generally square cross-section, other symmetric or irregular shapes such as a T-shape could be used. Support pin 192 fits within actuator/support spring 165 to prevent slippage between actuator/support spring 165 and the cartridge support 190. The spring 165 continuously biases the cartridge support 190 in the distal direction.

Figure 7:
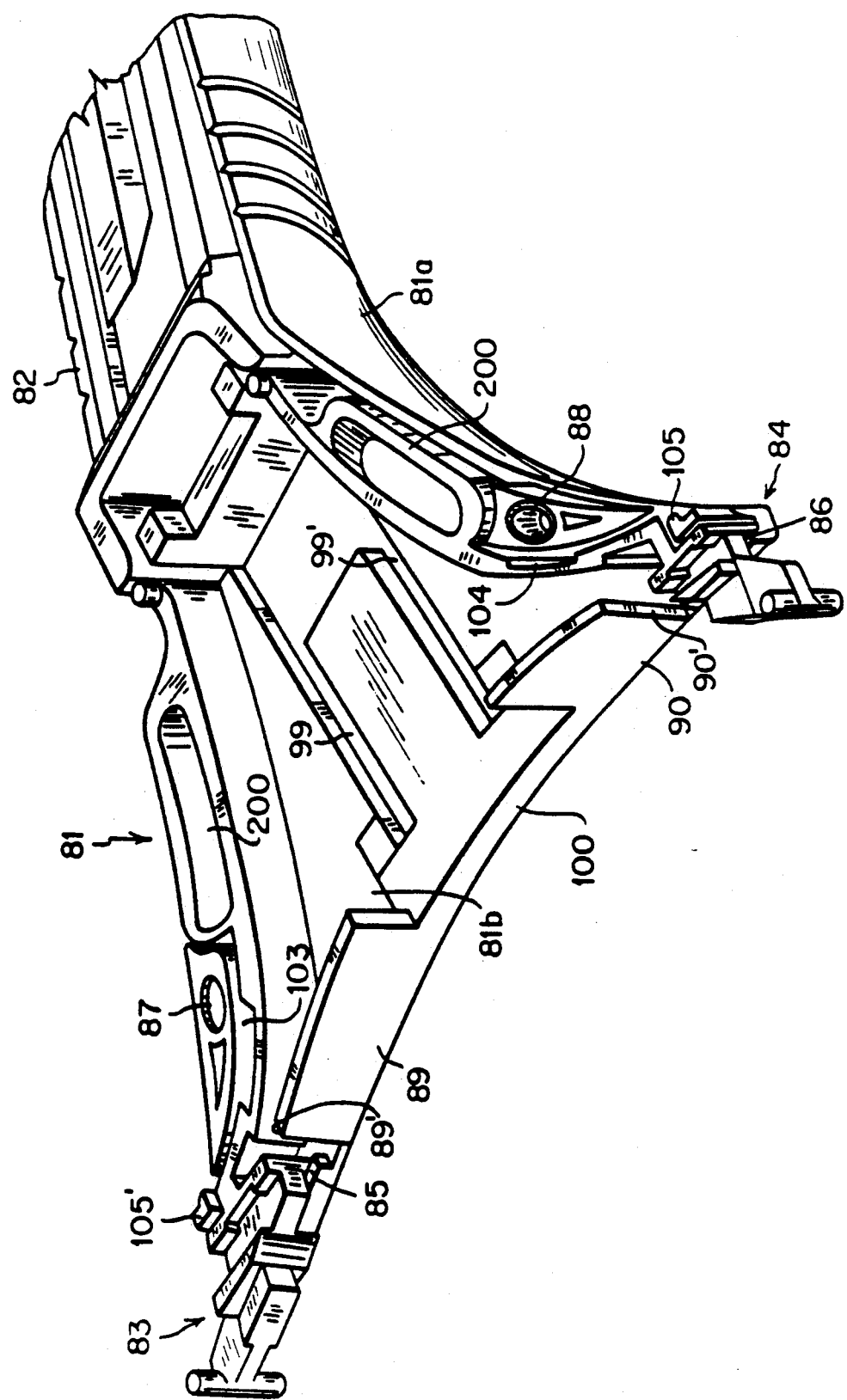
FIG. 7 is a top-view of the bottom assembly of the embodiment of the present invention illustrated in FIGS. 3 and 4.

Attachment pins 67 and 68 are provided on interior side 62b for engagement in corresponding receptacles 87 and 88 in the interior side 81b of bottom frame 80 shown in FIG. 7. As shown in FIG. 7, receptacles 87 and 88 are preferably chamfered to aid in the insertion of attachment pins 67 and 68. While the use of pins 67, 68 and corresponding receptacles 87 and 88 is preferred, it will be appreciated by those skilled in the art that top cover 60 and bottom frame 80 may be attached by any suitable method known in the art.

As shown in FIG. 6, control portion 62 has a shape which generally flares outwardly from gripping portion 61 and has guide ends 76 and 77 at the distal end of control portion 62 for reasons discussed below. The central distal portion 78 of top cover 60 does not extend as far distally as guide ends 76 and 77. A lateral guide rail 97 extends downwardly from guide end 77 and extends in a direction generally perpendicular to the longitudinal axis L of razor mechanism 10. A similar lateral guide rail 96 extends from guide end 76 and is also positioned substantially perpendicular to the longitudinal axis L of razor mechanism 10.

While gripping portion 61 and control portion 62 may be disposed generally in the same plane, in a preferred embodiment of the present invention as shown in FIGS. 5 and 6, gripping portion 61 is disposed at an angle to control portion 62. While the actual angle may vary, it will be appreciated by those skilled in the art that the angle is preferably in the range of about 145 to 160 degrees, and is most preferably about 150 degrees.

Also adjacent to window 65 on the interior side 62b of top cover 60 are grooved sections 71 and 72, shown in FIG. 6. The grooved sections 71 and 72 have outer edges which extend generally parallel to the longitudinal edges of window 65. These grooved sections 71 and 72 receive actuator shoulders 156,157 as the actuator 150 is moved within window 65.

Interior portion 62b of top cover 60 has two recesses 301, 302 (not shown) disposed adjacent window 65 and proximally of the grooved sections 71, 72, respectively. The recesses 301, 302 (not shown), along with corresponding recesses 101, 102 of bottom frame 80, pivotally secure the proximal ends of attachment members 200, 200' within the housing 50.

Figure 11:
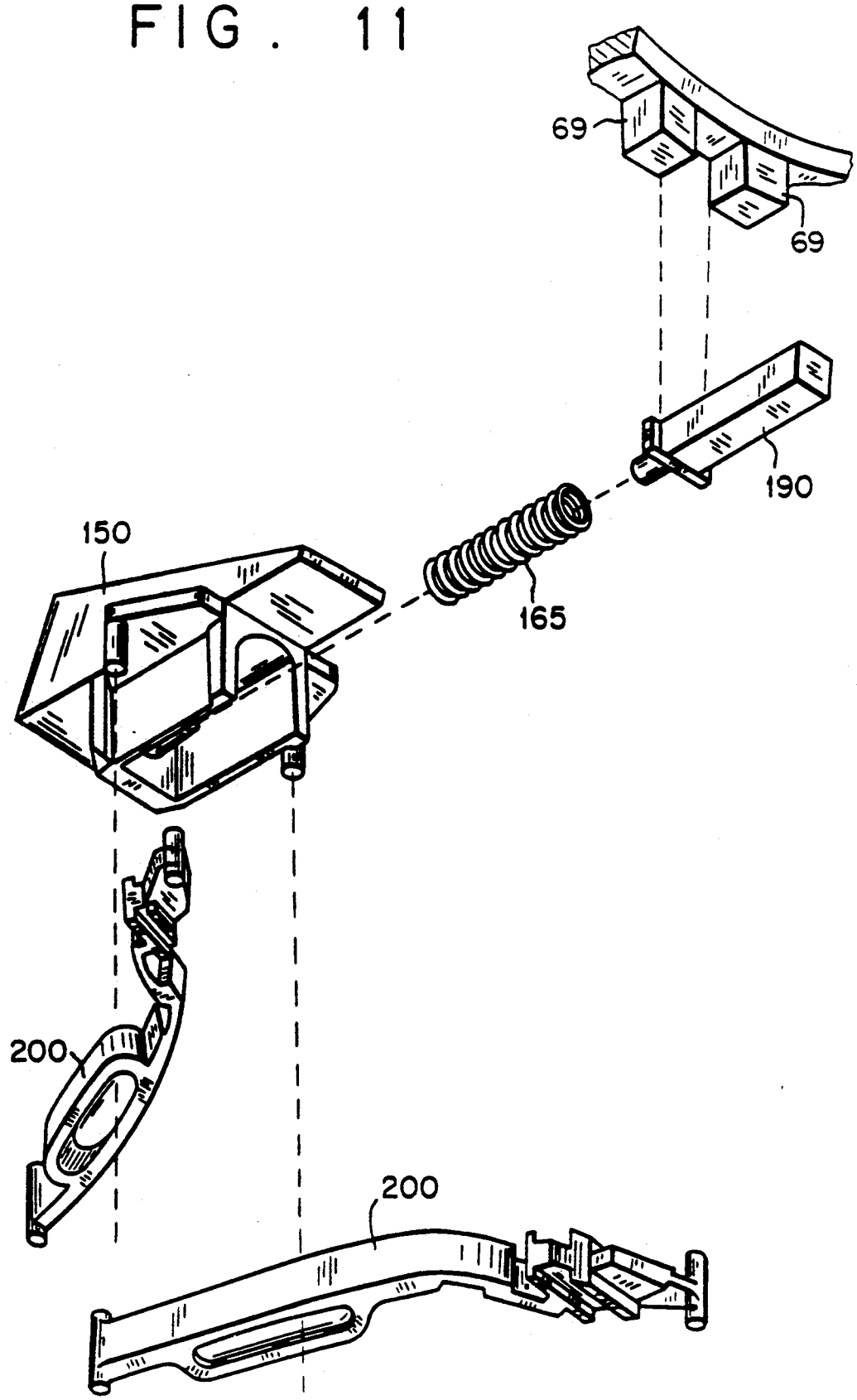
FIG. 11 is an exploded perspective view of the moving elements of the embodiment of the present invention shown in FIGS. 3 and 4.

An actuator 150, illustrated in FIGS. 5 and 11, is slidably disposed in window 65 of top cover 60. Actuator 150 comprises an upper gripping portion 152 having a width slightly less than the width of window 65 and a length slightly greater than the length of window 65. Upper gripping surface 152 may advantageously comprise raised protrusions in order to facilitate gripping of actuator 150 by a person desiring to position a cartridge on razor mechanism 10.

With reference to FIG. 6, actuator 150 also has shoulders 156 and 157 which are disposed below and to either side of upper gripping portion 152. The shoulders 156 and 157 extend outwardly such that the distance between the ends of shoulders 156 and 157 is greater than the width of window 65. As illustrated in FIG. 6, shoulders 156 and 157 are designed to slidingly fit within grooves 71 and 72 of control portion 62.

Actuator 150 also comprises prong members 180 and 181 which extend downwardly from shoulders 156 and 157 of actuator 150. In the illustrated embodiment, prong members 180 and 181 are positioned at the ends of shoulders 156 and 157 respectively, however, it will be appreciated that alternate positioning is possible within the scope of the present invention.

Figure 4:
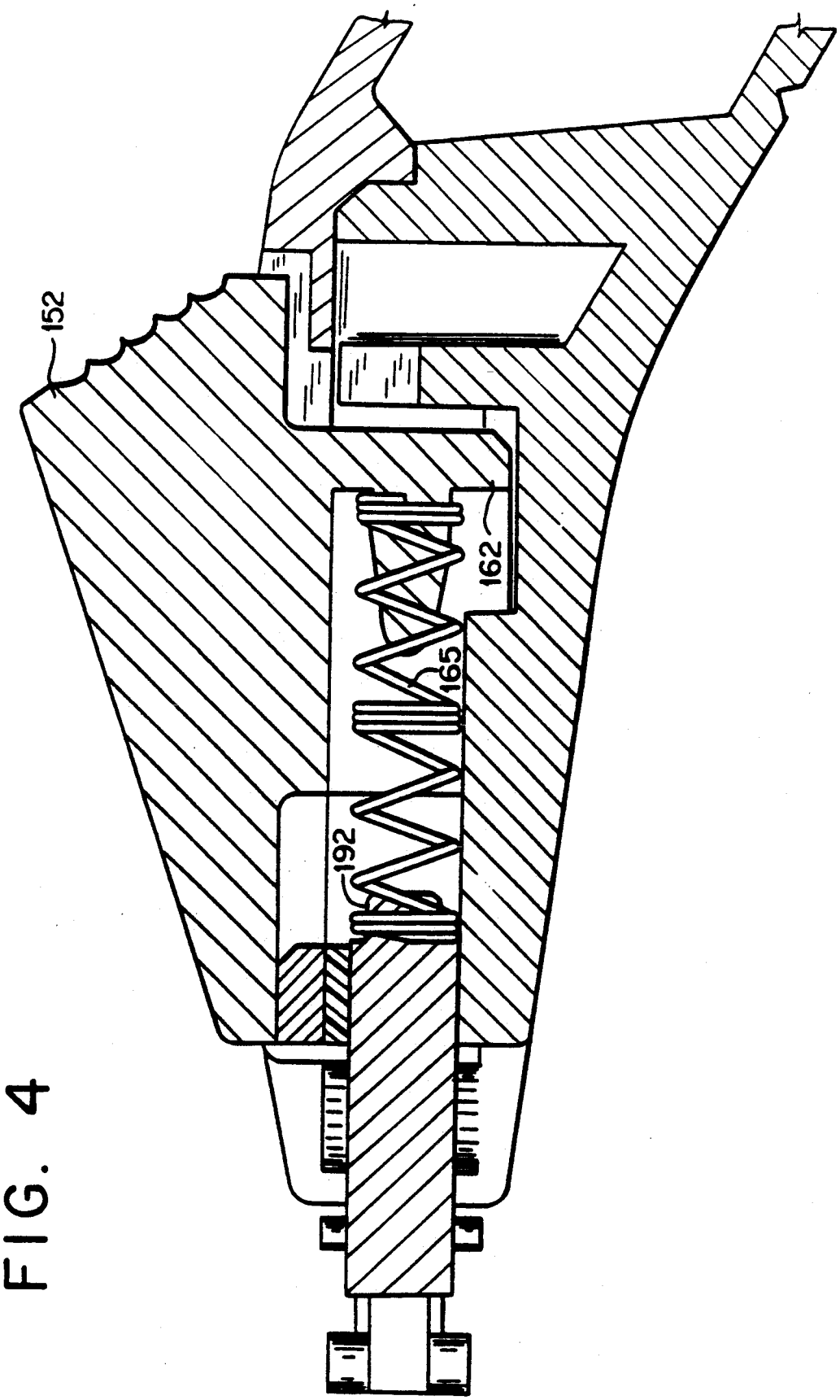
FIG. 4 is a cross-sectional, side-view of the razor mechanism of the present invention illustrated in FIG. 3 taken along lines 4—4.

Actuator 150 also has an actuator pin 161 best shown in FIG. 4, mounted on a support member 162 disposed below upper gripping surface 152 and toward the proximal end of actuator 150. Actuator pin 161 is designed to engage the proximal end of an actuator/support spring 165. As stated above, the distal end of actuator/support spring 165 engages support pin 192 and thereby biases actuator 150 toward the proximal end of control portion 62. As illustrated in FIG. 6, three sides of actuator pin 161 may be substantially surrounded by support member 162 and pin walls 166 and 167 in order to prevent other moving elements of the razor mechanism 10 from interfering with the action of actuator/support spring 165.

FIG. 11 is an exploded view showing the cooperative arrangement of abutment member 69, cartridge support 190, actuator/support spring 165, actuator 150, and attachment members 200, 200'.

From the above description, it will be appreciated that actuator 150, cartridge support 190 and spring 165 are designed for easy assembly with top cover 60. During assembly, the cartridge support 190 is placed within recess 69a of abutment member 69. The spring 165 is placed over the actuator pin 161 and, while the cartridge support 190 is held in place, gripping portion 152 of actuator 150 is inserted, distal end first, upwardly through window 65 of control portion 62 and the distal end of spring 165 is placed over support pin 192. It will be appreciated that shoulders 156 and 157 prevent actuator 150 from passing entirely through window 65. When the distal end of gripping portion 152 has passed through window 65, the actuator is slid distally compressing spring 165, and then actuator 150 is rotated so that the proximal end of gripping portion 152 passes through window 65. When the actuator 150 is released, spring 165, which is then in contact with support pin 192, urges actuator 150 proximally in window 65. In order to facilitate the placement of actuator 150 in window 65 of control portion 62, the distance between the distal end of the actuator shoulders 156, 157 and the proximal end of the gripping portion 152 is less than the longitudinal length of window 65. As stated above, the longitudinal length of gripping member 152 is greater than the longitudinal length of window 65, therefore, unless actuator 150 is rotated relative to control portion 62, actuator 150 will not fall downwardly through window 65 after it has been installed.

Thus it will be appreciated by those skilled in the art that a spring 165 may be placed upon pin actuator 161 and actuator 150 can then be easily positioned within control portion 62 of top cover 60. The spring 165 simultaneously serves the three purposes of biasing actuator 150 toward the proximal end of control portion 62, maintaining actuator 150 within the control portion 62 during normal operation of the razor mechanism 10, and biasing cartridge support 190 distally to maintain contact with a flexible cartridge.

With reference to FIG. 7, bottom frame 80 similarly has a control portion 81 and a stem portion 82. Control portion 81 has an exterior side 81a and an interior side 81b. Bottom frame 80 is shaped to correspond to top cover 60 such that control portion 81 also generally flares outwardly from stem portion 82. The distal end of control portion 81 has two guide ends 83, 84 and two lateral guide rail 85, 86 which, upon assembly of the housing 50, are aligned, but are not in contact with the two lateral guide rail 96, 97 of the top cover 60. Thus, the lateral guide rail 85, 86 of bottom frame 80 are disposed generally perpendicular to the longitudinal axis L of razor mechanism 10. The interior side 81b of bottom frame 80 also has two recesses 101, 102, (shown best in FIG. 3) which are preferably circular, in order to pivotally receive protrusions of attachment member 200 in a manner described below. Interior side 81b also has receptacles 87, 88 which receive the attachment pins 67, 68 of top cover 60. As stated above, receptacles 87 and 88 are preferably chamfered in order to facilitate the aligning of the pins 67, 68 within the receptacles 87, 88. The attachment pins 67, 68 of top cover 60 are securably locked within the receptacles 87, 88 of the bottom frame 80 by any suitable method known in the art, such as by ultrasonic welding.

The central, distal portion 100 of bottom frame 80 does not extend as far distally as the guide ends 83, 84. Disposed between the center of distal portion 100 and the guide ends 83, 84 are lower end plates 89, 90 which extend upwardly from the interior side 81b of bottom frame 80. The lower end plates 89, 90, in cooperation with abutment member 69, substantially seal the distal end of housing 50 to prevent soap, hair and other debris from entering the interior of housing 50 and interfering with the movement of pieces located therein. With the exception of the openings in the distal end of housing 50 which allow passage of the attachment members and cartridge support, top cover 60 and bottom frame 80 are preferably in contact to prevent debris from entering the interior of housing 50 from other sides as well.

As shown in FIG. 7, interior guide surfaces 103 and 104 are advantageously disposed adjacent to receptacles 87 and 88, near the exterior edges of bottom frame 80 on interior side 81b. The interior guide surfaces 103, 104, along with the lower end plates 89, 90, generally define a guide channel for the attachment members 200, 200'.

Disposed toward the distal ends of the interior guide surfaces 103, 104 and spaced proximally from the lateral guide rails 85, 86 are two stops 105, 105' which protrude upwardly from interior surface 81b. The stops 105, 105' limit the outward movement of the two attachment members 200, 200'. The inward movement is limited by the outer edges 89', 90' of the two lower end plates 89,90.

Bottom frame 80 also comprises generally rectangular slots 99, 99' which are spaced by a distance slightly greater than the width of support member 162. Rectangular slots 99, 99' receive the lower end of actuator 150 defined by pin walls 166 and 167 in order to provide further guidance and support to the sliding movement of actuator 150 within housing 50.

With reference to FIGS. 8-10, the attachment member 200 of one embodiment of the present invention comprises a proximal end and a distal end 202. As best shown in FIG. 9, the proximal end has protrusions 210 and 211 which are adapted to pivotally connect attachment member 200 to the recesses 301 and 101 in top cover 60 and bottom frame 80, respectively. It will be appreciated by those skilled in the art that other mechanical arrangements may be utilized in pivotally attaching the proximal end of attachment member 200 within housing 50.

Attachment member 200 also comprises an actuator receptor 220 which receives a prong member 180 of actuator 150. When attachment member 200 is disposed within housing 50 and the proximal end of attachment member 200 is pivotally attached in recesses 101 and 301, the actuator receptor 220 is disposed at an acute angle to the longitudinal axis L of razor mechanism 10. The acute angle, which is defined by a central line passing down the center of actuator receptor 220 and the longitudinal axis L of housing 50, is preferably between about 20 and 45 degrees when the attachment member 200 is in a relaxed position i.e. when attachment member 200 is not subject to outside forces such as those exerted by the actuator 150 or by a flexed cartridge at distal end 202. When attachment member 200 is in this "relaxed" position, prong 180 of actuator 150 is disposed at the proximal end of actuator receptor 220. While actuator receptor 220 preferably has chamfered rails 221, 222 on both sides and preferably passes entirely through attachment member 200, it will be appreciated by those skilled in the art that similarly positioned grooves which do not pass entirely through attachment member 200 may be utilized.

As shown in FIGS. 8 and 9, attachment member 200 has lateral guide grooves 230 and 231, spaced slightly from distal end 202 of attachment member 200 which are designed to receive lateral guide rails 96 and 86 of housing top cover 60 and bottom frame 80, respectively. Lateral guide groove 230 has opposing generally parallel surfaces 232 and 233 which generally abut the lateral guide rail 96 of top cover 60. As stated above, lateral guide rails 85, 86, 96 and 97 are all disposed substantially perpendicular to the longitudinal axis L of razor mechanism 10. Therefore, the engagement of the lateral guide rails within the lateral guide grooves of the attachment members 200, 200' maintains the relative motion of the distal ends of attachment members 200 and 200' substantially perpendicular to the longitudinal axis of razor mechanism 10.

Disposed at the inner and outer edges of lateral guide groove 230 are inner stop surface 235 and outer stop surface 236. Outer stop surface 236 is aligned to contact stop 105' and thereby limits the outward movement of attachment member 200 when attachment member 200 is in a "relaxed" position. Inner stop surface 235 is aligned to contact lower end plate 90 which thereby limits the inward movement of attachment member 200 when an inwardly directed force is exerted on attachment member 200.

Since attachment member 200 is pivotally attached to housing 50 at the proximal end, it will be appreciated by those skilled in the art that if attachment member 200 was not sufficiently flexible in the region between actuator receptor 220 and distal end 202, the distal end 202 of pivot member 200 would tend to rotate around the recesses 101, 301 instead of moving perpendicular to the longitudinal axis L of razor mechanism 10 as desired in this embodiment. For this reason, attachment member 200 is provided with flexure points 239 and 240 between actuator receptor 220 and lateral guide grooves 230, 231. Flexure points 239 and 240 are preferably simply formed by using a resilient material, e.g. an acetal copolymer, when forming attachment member 200, and by keeping the thickness of attachment member 200 at these additional flexure points 239 and 24 within limits which allow the flexing but prevent breakage of the attachment member 200.

Distal end 202 of attachment member 200 has protrusion members 250 and 251 mounted on neck 255. As shown in FIG. 10, which is a top view of the distal end 202 of attachment member 200 taken from the direction indicated by ARROW 9 in FIG. 8, neck 255 may be advantageously tapered having a narrower end 256 immediately adjacent the protrusion members 250, 251 and gradually get wider toward the proximal end of pivot member 200 until reaching shoulders 257 and 258. The advantages provided by this tapered configuration are discussed below.

In the embodiment illustrated in FIG. 3, the attachment members are arranged such that the proximal ends 201, 201' are pivotally connected to the interior of housing 50, the actuator receptors 220, 220' receive prong members 180, 181, the lateral guide grooves are slidingly engaged by the lateral guide rails disposed at the distal ends of housing 50, and the distal ends 202, 202' of the attachment members are disposed outside of housing 50. In this manner, the attachment ends of attachment members are guided in a direction substantially perpendicular to longitudinal axis L in response to forces applied by a flexing cartridge or by actuator 150.

When actuator 150 is slid toward the distal end of housing 50, the two prong members 180, 181 engage the inner edges of two corresponding actuator receptors 220, 220'. Since the prong members 180, 181 move parallel to the longitudinal axis L of the razor handle mechanism 10, it will be appreciated from the above description and Figures that the distal end 223 of actuator receptor 220 is pulled toward the center of the razor mechanism 10. Movement of actuator receptor 220, therefore, causes the lateral movement of distal end 202 of attachment member 200 which, due to the cooperation of lateral guide grooves 230, 231 within lateral guide rails 301, 101, is substantially perpendicular to the longitudinal axis L of razor mechanism 10. This "inward" lateral movement of the distal ends of attachment members 200, 200' enables the easy attachment and detachment of a flexible cartridge having a corresponding connector receptor, as discussed below. Upon the release of actuator 150, actuator/support spring 165 urges the actuator in the proximal direction. The two prong members 180,181 engage the outer edges of the corresponding actuator receptors 220,220' as the actuator 150 urges the attachment members 200,200' away from the center of the razor mechanism 10.

The operation of the attachment member 200 within housing 50 is similar to a conventional 4-bar linkage mechanism. The 4-bars are generally defined by: 1) the lower portion of the attachment member extending from the proximal end to first flexure point 239; 2) the extension of attachment member 200 between the first flexure point 239 and the second flexure point 240; 3) the portion of attachment member 200 disposed between second flexure point 240 and lateral guide groove 230, and 4) the portion of housing 50 between the recesses 101 and 301 which receive protrusions 210 and 211 at the proximal end of attachment member 200 and the lateral guide rails 96 and 86 which cooperate with lateral guide grooves 230 and 231 of attachment member 200.

Figure 12:
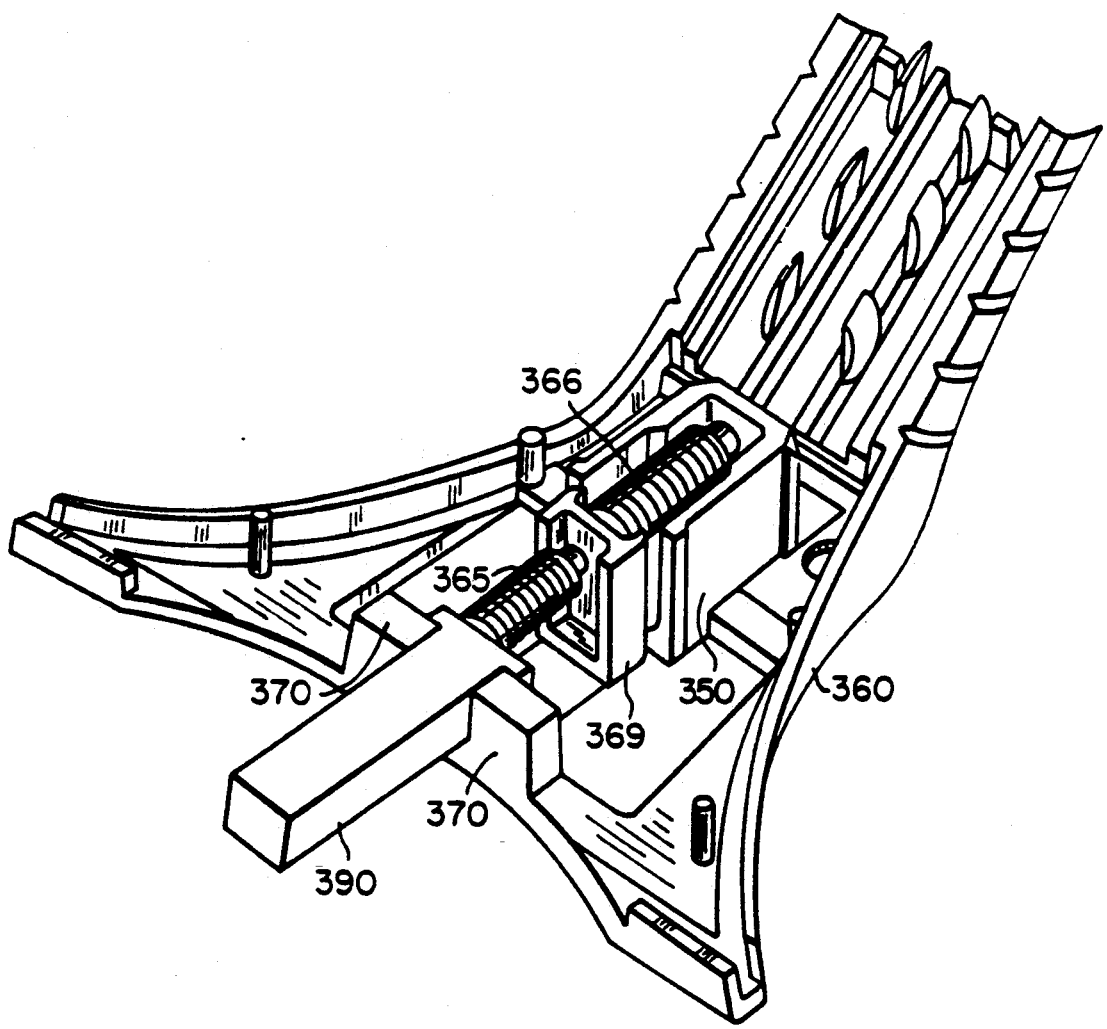
FIG. 12 is a perspective bottom-view of the top cover assembly of a second embodiment of the razor mechanism of the present invention.
Figure 13:
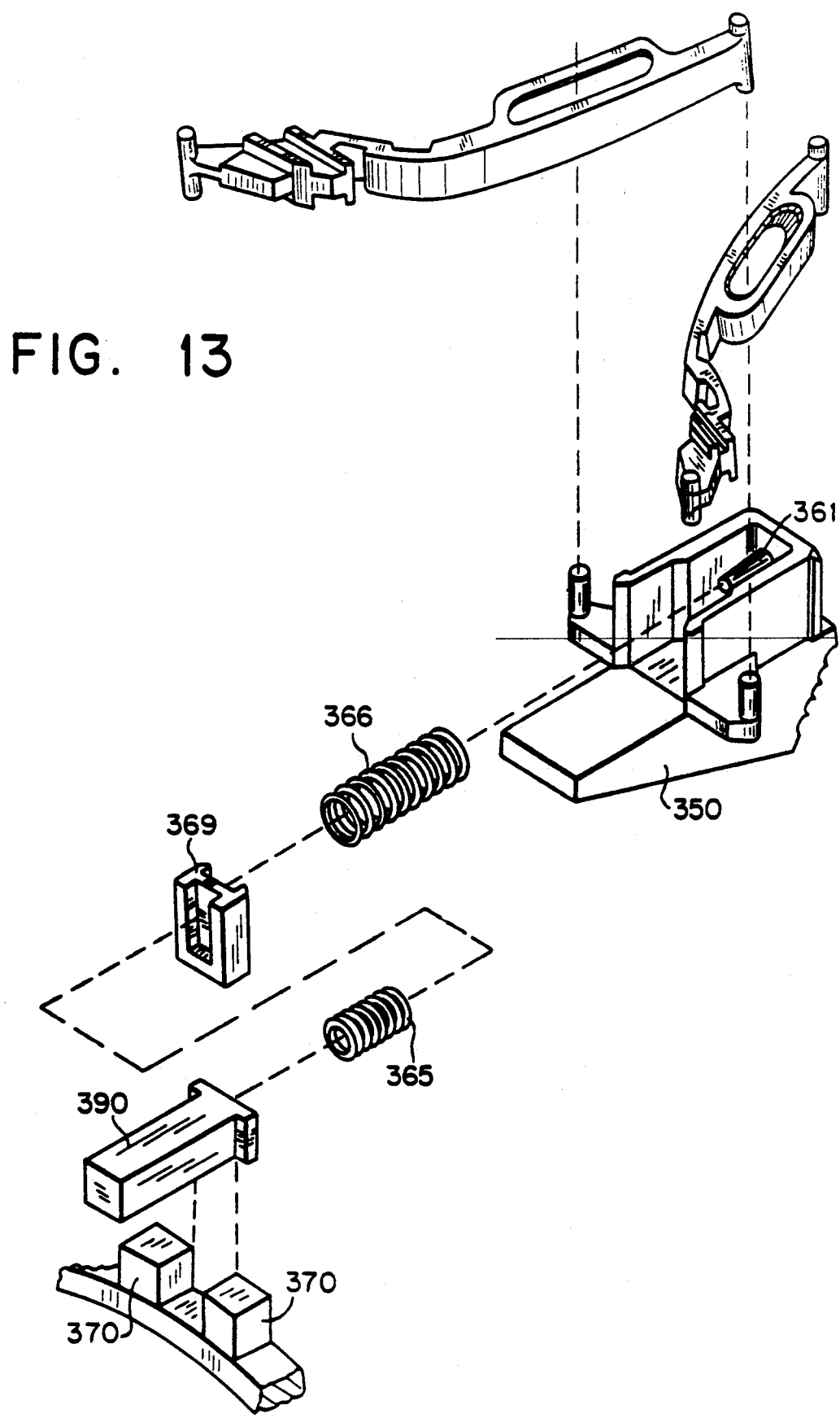
FIG. 13 is an exploded perspective view of the moving elements of the embodiment of the present invention illustrated in FIG. 12.
Figure 14:
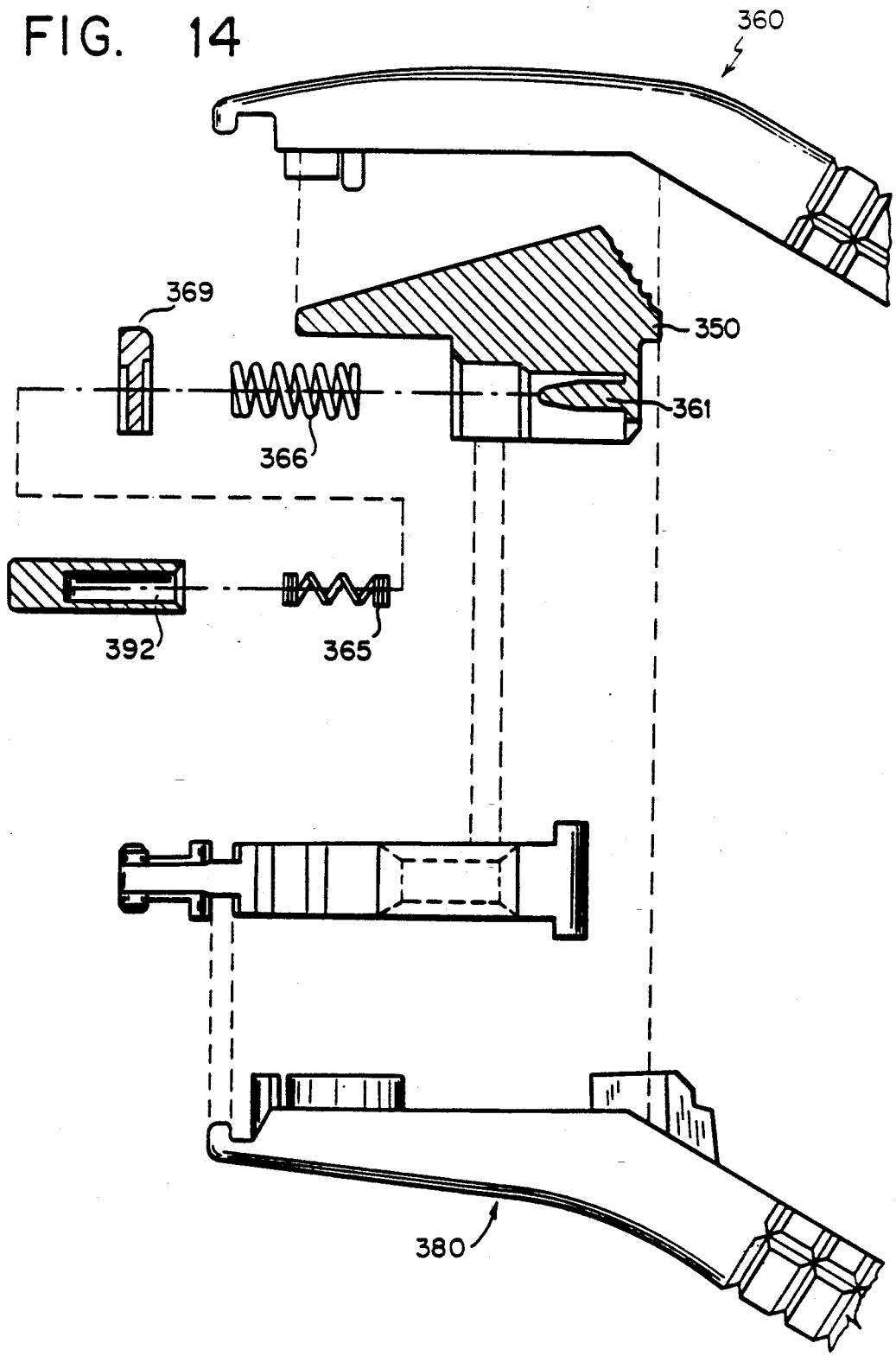
FIG. 14 is an exploded side-view of the embodiment of the present invention illustrated in FIGS. 12 and 13.

With reference to FIGS. 12-14, an alternative embodiment of the present invention is illustrated which uses a tandem spring arrangement for biasing a cartridge support 390 and an actuator 350. In accordance with this embodiment, a support spring 365 extends into a bore 392 in the proximal end of cartridge support 390 and abuts the distal end of a stationary abutment member 369. An actuator spring 366 is disposed between the proximal side of the abutment member 369 and actuator pin 361. As illustrated, the abutment member 369 is spaced from the distal end of top cover 360. In this manner, cartridge support 390 is continuously biased distally to a point limited by distal abutment member 370, and actuator 350 is biased in the proximal direction.

In all other respects, the tandem spring design of this embodiment of the present invention operates in a fashion similar to the embodiment described above.

The two spring design permits the application of different forces on the cartridge support and actuator, respectively. By providing one spring with a greater tension than the other spring, it will be appreciated by those skilled in the art that the forces applied to the actuator and cartridge support can be independently controlled.

Figure 15:
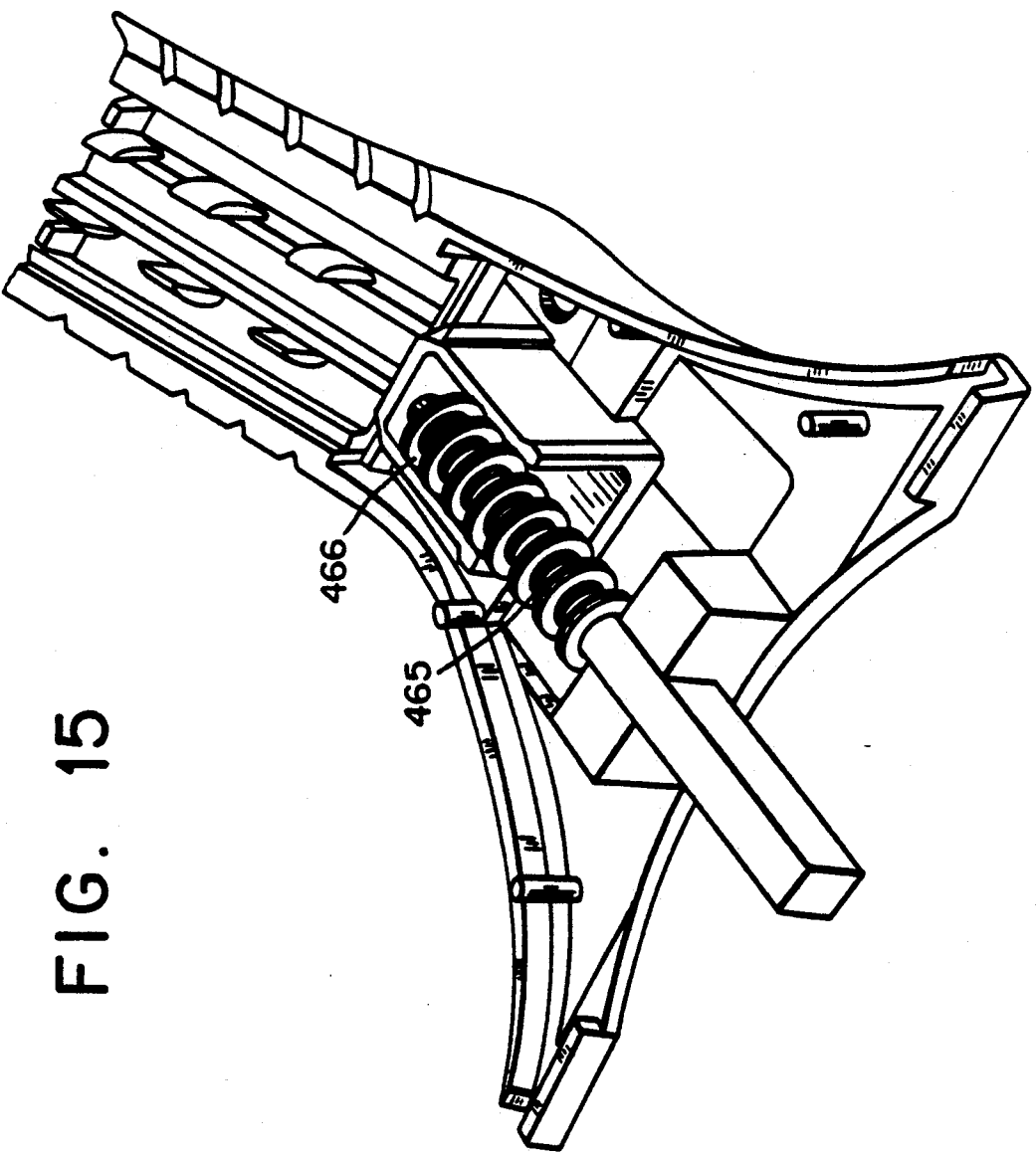
FIG. 15 is a perspective bottom-view of the top cover assembly of a third embodiment of the razor mechanism of the present invention.
Figure 16:
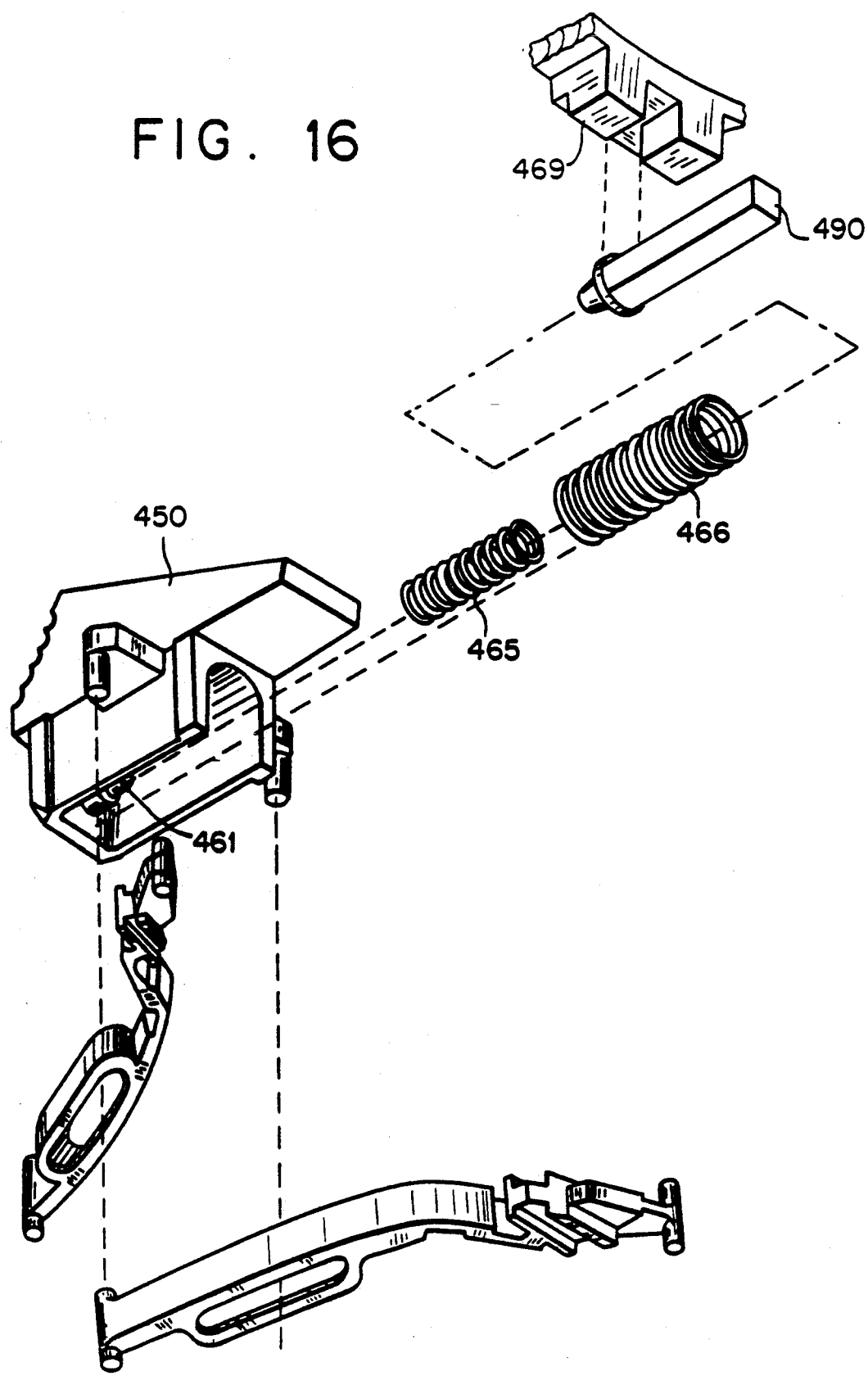
FIG. 16 is an exploded perspective view of the moving elements of a third embodiment of the present invention illustrated in FIG. 15.

With reference to FIGS. 15 and 16, a third embodiment of the present invention is shown which also utilizes two separate springs for biasing a cartridge support and an actuator. In this embodiment, a support spring 465 is disposed in overlapping and concentric arrangement with an actuator spring 466. Support spring 465 engages both the actuator pin 461 and the slidable cartridge support 490. Actuator spring 466 engages the support member 462 of actuator 450 and the proximal side of abutment member 469. This embodiment has the advantage of providing the ability to independently control the forces maintained on the actuator and cartridge support while reducing the space within the razor mechanism which is used by the biasing elements. Since it is often desirable to minimize the size of a razor mechanism for aesthetic and other purposes, the embodiment of FIGS. 15 and 16 can be particularly desirable.

Figure 17:
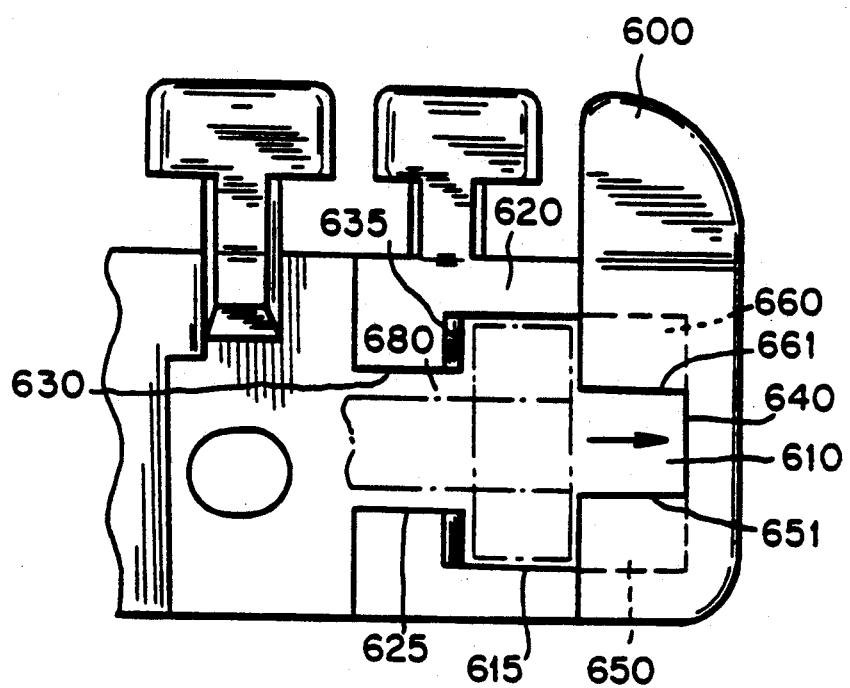
FIG. 17 is a bottom-view of a portion of a flexible cartridge which may be used with the razor mechanism of the present invention.

With reference to FIG. 17, a portion of flexible cartridge 600 adapted to be supported by the razor mechanism 10 of the present invention is shown. The cartridge 600 has an attachment slot 610 defined by outer sidewalls 615 and 620, inner wall 635, outer wall 640, and two slot cover plates 650, 660 having inner edges 651, 661, respectively. Inner wall 635 has an inner wall slot 680 defined by inner side walls 625, 630. The slot cover plates 650, 660 cover the outer ends of the slot 610 but, as shown in FIG. 17, leave a portion of the inner end of slot 610 and the entire central region of slot 610 uncovered for the passage of neck 255 of attachment member 200.

In order to attach the flexible cartridge 600 to attachments members 200, 200' of razor mechanism 10, the actuator 150 is moved distally causing distal ends 202, 202' to move "inwardly", i.e. toward the center of razor mechanism 10. The protrusions members 250, 251 are inserted into the inner end of slot 610 and then, upon release of actuator 150, are biased outwardly to the end of slot 610 covered by the slot cover plates 650, 660.

When flexible cartridge 600 is positioned on attachment members 200, 200' and flexible cartridge 600 is in a relaxed position, only an upper portion of tapered neck 255 will be disposed within slot 610 and inner wall slot 680. However, when the flexible cartridge 600 is flexed during shaving, a greater portion of neck 255 will enter and be disposed within slot 610 and inner wall slot 680. When neck 255 has the preferred tapered shape as shown in FIG. 10, it will be appreciated by those skilled in the art that the clearance between neck 255 and inner edges 651 and 661 will decrease, preferably to the point of contact, when cartridge 600 is flexed during shaving. In this manner, the flexing of flexible cartridge 600 serves to form a tighter connection between cartridge 600 and razor handle 10 which is thereby less likely to rock or pivot.

In order to adequately support a flexible cartridge, at least one of the attachment members of the present invention must be movable, however, it is not required that the movement be in a direction perpendicular to the longitudinal axis L. It will be appreciated that a pair of movable rigid attachment members may be provided by simply forming the attachment members described above with a rigid material and eliminating the reduced thickness flexure points. The rigid attachment members could be similarly engaged with a spring-biased actuator, identical to actuator 150 described above, for biasing the rigid attachment members outward, i.e. away from the longitudinal axis of the razor mechanism. Since the attachment ends of such attachment members would move in an arcuate path, the guide grooves would have to be modified slightly. However, since each attachment end moves only a short distance, the short arcuate path approximates a straight line and adequately supports a flexible cartridge.

Alternatively, rigid attachment members may be slidably disposed in lateral grooves for movement in the direction perpendicular to the longitudinal axis of the razor. The rigid attachment members could be urged outwardly, i.e. away from the central longitudinal axis, by a laterally disposed spring.

The present invention advantageously utilizes the combined forces of a center cartridge support and at least one outwardly biased attachment member, to return a flexible cartridge to a substantially straight configuration. The center cartridge support is preferably freely slidable in order to constantly maintain a distally-directed force on a bent flexible cartridge.

As used herein, the term "flexible" includes shaving blade assemblies in which the amount of flexing thereof in response to normal human shaving forces is sufficient to substantially conform the blade assembly to many of the non-planar surfaces shaved, and to exclude the relatively rigid prior art shaving blade assemblies which in response to those same shaving forces do not flex or yield more than an insignificant amount insofar as contour-following characteristics are concerned.

It will be appreciated by those skilled in the art that a typical razor cartridge is on the order of about 1.6 inches long. The present invention is designed to support flexible razor cartridges which may be deflected up to about 0.20 inches and preferably about 0.120 inches at their midpoints. It will be appreciated that this deflection is measured as the distance between the midpoint of the razor cartridge when the razor cartridge is in a "relaxed", generally straight configuration and when the cartridge is flexed as much as the razor mechanism of the present invention will permit during shaving. The attachment members of the present invention are designed to each move a maximum distance of about 0.040 inches, and preferably to move a distance of about 0.015 inches. The attachment members preferably move about 0.015 inches when the midpoint of the flexible cartridge is deflected about 0.120 inches. The attachment members preferably move about 0.050 inches in response to forces between about 60 and 150 grams and most preferably about 120 grams.

What is claimed is:

1. A razor mechanism, having a central longitudinal axis, for use with a flexible cartridge comprising:
    means for supporting said flexible cartridge on said razor mechanism,
    said supporting means being moveable in a direction toward said longitudinal axis of said razor mechanism in response to the flexing of said flexible cartridge during shaving; and
    a cartridge support slidably disposed substantially parallel to said longitudinal axis.

2. A razor mechanism according to claim 1 wherein said razor mechanism comprises a proximal end and a distal end and said cartridge support is distally biased.

3. A razor mechanism according to claim 1 further comprising:
    a housing having a substantially enclosed interior portion, a distal end, a proximal end and a central longitudinal axis extending from said distal end to said proximal end;
    an actuator slidably connected to said housing for movement in a direction substantially parallel to said longitudinal axis, said actuator comprising at least one prong member;
    wherein said actuator engages said supporting means such that at least a portion of said supporting means moves toward said longitudinal axis in response to the movement of said actuator.

4. A razor mechanism according to claim 3 wherein said supporting means comprises an attachment member having a pivoting end and an attachment end, wherein said pivoting end is pivotally connected to said housing within said interior portion, and said attachment end is moveable in response to flexing of said flexible cartridge during shaving.

5. A razor mechanism according to claim 4 wherein said razor mechanism comprises two attachment members disposed on opposite sides of said central longitudinal axis.

6. A razor mechanism according to claim 4 wherein said attachment member has at least one lateral guide groove;
    said housing has at least one lateral guide edge disposed substantially perpendicular to said longitudinal axis; and
    wherein said lateral guide groove engages said lateral guide edge to guide said attachment end in a direction substantially perpendicular to said longitudinal axis.

7. A razor mechanism according to claim 4 wherein said attachment member comprises at least two flexure points.

8. A razor mechanism according to claim 4 wherein said attachment member comprises an actuator receptor which slidingly receives said prong member.

9. A razor mechanism according to claim 8 wherein said actuator receptor is normally disposed at an obtuse angle with said longitudinal axis.

10. A razor mechanism according to claim 4 wherein said attachment end comprises a neck member having an outer end and an inner end, and wherein said outer end of said neck member is narrower than said inner end of said neck member.

11. A razor mechanism according to claim 10 wherein said neck member tapers gradually from said outer end to said inner end.

12. A razor mechanism according to claim 3 wherein said actuator is biased toward said proximal end of said housing.

13. A razor mechanism according to claim 12 wherein said actuator is biased by at least one spring.

14. A razor mechanism according to claim 3 wherein said portion of said supporting means moves in a direction substantially perpendicular to said longitudinal axis.

15. A razor mechanism according to claim 3 wherein said actuator and said cartridge support are biased by a single spring.

16. A razor mechanism according to claim 3 wherein said actuator and said cartridge support are separately biased by two springs arranged in tandem.

17. A razor mechanism according to claim 3 wherein said actuator is biased by two separate springs disposed in overlapping arrangement and said cartridge support is biased by at least one of said springs.

18. A razor mechanism for use with a flexible cartridge comprising:
    a housing having a substantially enclosed interior portion, a distal end, a proximal end and a central longitudinal axis extending from said distal end to said proximal end;

an actuator slidably connected to said housing for movement in a direction substantially parallel to said longitudinal axis, said actuator comprising at least one prong member;

an attachment member having a pivoting end and an attachment end, wherein said pivoting end pivotally engages said housing within said interior portion, and said attachment end is moveable in response to flexing of said flexible cartridge during shaving;

wherein said actuator engages said attachment member such that said attachment end moves toward said longitudinal axis in response to the movement of said actuator; and a cartridge support slidably engaged with said housing for returning a flexed cartridge to a substantially linear configuration.

19. A razor mechanism according to claim 18 wherein said razor mechanism comprises two attachment members disposed on opposite sides of said central longitudinal axis.

20. A razor mechanism according to claim 18 wherein said attachment member has at least one lateral guide groove;
said housing has at least one lateral guide rail disposed substantially perpendicular to said longitudinal axis; and
wherein said lateral guide groove engages said lateral guide rail to guide said attachment end in a direction substantially perpendicular to said longitudinal axis.

21. A razor mechanism according to claim 18 wherein said attachment member comprises at least two flexure points.

22. A razor mechanism according to claim 18 wherein said attachment member moves in a direction substantially perpendicular to said longitudinal axis.

23. A razor mechanism according to claim 18 wherein said actuator and said cartridge support are biased by a single spring.

24. A razor mechanism according to claim 18 wherein said actuator and said cartridge support are separately biased by two springs arranged in tandem.

25. A razor mechanism according to claim 18 wherein said actuator is biased by two separate springs disposed in overlapping arrangement and said cartridge support is biased by at least one of said springs.

26. A razor mechanism comprising:
a base member having a central longitudinal axis;
means for attaching a flexible cartridge to said razor mechanism such that said cartridge is disposed substantially perpendicular to said longitudinal axis, wherein said attaching means is movably connected to said base member;
means for moving said attaching means such that upon movement of said moving means, at least a portion of said attaching means moves toward said longitudinal axis;
wherein said attaching means is also moveable toward said longitudinal axis in response to flexing of said flexible cartridge during shaving; and
a cartridge support slidably connected to said base member for movement substantially parallel to said central longitudinal axis.

27. A razor mechanism according to claim 26 wherein said attaching means is pivotally connected to said base member and said attaching means has at least one flexure area which permits the flexing of said attaching means.

28. A razor mechanism according to claim 27 wherein said attaching means comprises at least one substantially rigid attachment member slidably disposed on said base member.

29. A razor mechanism according to claim 28 wherein said attaching means comprises two substantially rigid attachment members which are biased away from said central longitudinal axis by a spring.

30. A razor mechanism according to claim 26 wherein said attaching means comprises more than one attachment member.

31. A razor mechanism according to claim 26 wherein said moving means is a slidable actuator having at least one prong member which slidingly engages said attaching means.

32. A razor mechanism according to claim 31 wherein said razor mechanism has a distal end and a proximal end and wherein said slidable actuator is biased toward said proximal end.

33. A razor mechanism for use with a flexible cartridge comprising:
a housing having a distal end, a proximal end, a central longitudinal axis extending from said distal end to said proximal end, a substantially enclosed interior region, and at least one guide rail disposed substantially perpendicular to said longitudinal axis;
at least one attachment member disposed at least partially within said housing, said attachment member having a proximal end pivotally connected to said housing in said interior region and at least one lateral groove which slidingly engages said guide rail;
said attachment member further comprising an attachment end which is moveable in a direction substantially perpendicular to said longitudinal axis of said razor mechanism in response to the flexing of said flexible cartridge during shaving;
an actuator slidably connected to said housing along said longitudinal axis and in moveable engagement with said attachment member, wherein said actuator is biased toward the proximal end of said housing and wherein the movement of said actuator toward the distal end of said housing moves said attachment end in a direction substantially perpendicular to said longitudinal axis; and
a distally biased cartridge support slidably connected to said housing and extending at least partially outside said distal end of said housing.

* * * * *